(12) United States Patent
Partanen et al.

(10) Patent No.: US 6,172,996 B1
(45) Date of Patent: Jan. 9, 2001

(54) APPARATUS AND METHOD FOR FORMING THREE-DIMENSIONAL OBJECTS IN STEREOLITHOGRAPHY UTILIZING A LASER EXPOSURE SYSTEM WITH A DIODE PUMPED FREQUENCY-MULTIPLIED SOLID STATE LASER

(75) Inventors: Jouni P. Partanen, Los Angeles; William F. Hug, Pasadena, both of CA (US)

(73) Assignee: 3D Systems, Inc., Valencia, CA (US)

( * ) Notice: Under 35 U.S.C. 154(b), the term of this patent shall be extended for 0 days.

(21) Appl. No.: 09/435,326

(22) Filed: Nov. 5, 1999

Related U.S. Application Data (60) Continuation of application No. 09/193,985, filed on Nov. 18, 1998, now abandoned, which is a division of application No. 08/792,347, filed on Jan. 31, 1997, now Pat. No. 5,840,239.

(51) Int. Cl.[7] .................................................. B29C 35/08
(52) U.S. Cl. ......................... 372/22; 264/308; 264/401; 425/174.4; 425/375
(58) Field of Search .................................... 264/308, 401; 425/174.4, 375; 359/326–332; 372/21–22; 385/122

(56) References Cited

U.S. PATENT DOCUMENTS

| | | | |
|---|---|---|---|
| 4,665,529 | * | 5/1987 | Baer et al. ............................ 372/107 |
| 4,723,257 | * | 2/1988 | Baer et al. ............................ 372/108 |

(List continued on next page.)

FOREIGN PATENT DOCUMENTS

| | | | |
|---|---|---|---|
| 44 44 435 | * | 6/1996 | (DE) . |
| 6-143437 | * | 5/1994 | (JP) . |
| 6-283786 | * | 10 1994 | (JP) . |
| WO 96/19855 | * | 6/1996 | (WO) . |
| WO 96/34435 | * | 10 1996 | (WO) . |
| WO 96/35246 | * | 11/1996 | (WO) . |
| WO 96/37022 | * | 11 1996 | (WO) . |
| WO 96/37023 | * | 11/1996 | (WO) . |

OTHER PUBLICATIONS

Partanen, Jouni P., "Lasers and Optics in Stereolithography, The International Society for Optical Engineering", 2703 (Jan. 27–Feb. 2, 1996): pp. 502–511.*

* cited by examiner

*Primary Examiner*—John D. Lee
(74) *Attorney, Agent, or Firm*—Robert Laurenson; Ralph D'Alessandro

(57) ABSTRACT

Embodiments of the instant invention are directed to laser exposure system that employs a pulsed solid state laser to provide a reactive response wavelength and a pulse repetition rate specifically optimized for application to solidification of a liquid photopolymer in a stereolithographic process. The solid state laser employs two second harmonic crystals for generating an emission wavelength at about 320–345 nm and a pulse repetition rate, wherein the pulse repetition rate is selected such that a pulse separation at the target surface results which is less than a diameter of the beam when the beam is being scanned at a desired velocity and an average exposure deposited by the beam is equal to a desired amount.

16 Claims, 5 Drawing Sheets

U.S. PATENT DOCUMENTS

| | | | |
|---|---|---|---|
| 4,756,003 | * 7/1988 | Baer | 372/75 |
| 4,785,459 | * 11/1988 | Baer | 372/75 |
| 4,794,615 | * 12/1988 | Berger et al. | 372/69 |
| 4,826,283 | 5/1989 | Changtian et al. | 385/122 |
| 4,837,771 | * 6/1989 | Baer | 372/75 |
| 4,847,851 | * 7/1989 | Dixon | 372/75 |
| 4,864,584 | * 9/1989 | Martin | 372/75 |
| 4,872,177 | * 10/1989 | Baer et al. | 372/75 |
| 4,884,277 | * 11/1989 | Anthon et al. | 372/22 |
| 4,884,281 | * 11/1989 | Hawthorn et al. | 372/75 |
| 4,890,289 | * 12/1989 | Basu et al. | 372/33 |
| 4,894,839 | * 1/1990 | Baer | 372/93 |
| 4,908,832 | * 3/1990 | Baer | 372/75 |
| 4,933,947 | * 6/1990 | Anthon et al. | 372/34 |
| 5,159,602 | * 10/1992 | Giordano et al. | 372/21 X |
| 5,170,409 | * 12/1992 | Nightingale et al. | 372/107 |
| 5,192,469 | * 3/1993 | Smalley et al. | 264/401 |
| 5,249,196 | * 9/1993 | Scheps | 372/93 |
| 5,257,277 | * 10/1993 | Yagi et al. | 372/75 |
| 5,278,852 | * 1/1994 | Wu et al. | 372/22 |
| 5,315,612 | * 5/1994 | Alcock et al. | 372/69 |
| 5,345,391 | * 9/1994 | Hull et al. | 364/474.24 |
| 5,351,259 | * 9/1994 | Ishimori et al. | 372/75 |
| 5,363,391 | * 11/1994 | Matthews et al. | 372/36 |
| 5,377,212 | 12/1994 | Tatsuno et al. | 372/22 |
| 5,394,413 | * 2/1995 | Zayhowski | 372/22 X |
| 5,410,559 | * 4/1995 | Nighan, Jr. et al. | 372/19 |
| 5,412,683 | * 5/1995 | Nighan, Jr. et al. | 372/75 |
| 5,429,908 | * 7/1995 | Hokuf et al. | 264/401 X |
| 5,436,990 | * 7/1995 | Head et al. | 385/34 |
| 5,446,749 | * 8/1995 | Nighan, Jr. et al. | 372/22 |
| 5,455,838 | * 10/1995 | Heritier et al. | 372/75 |
| 5,511,085 | 4/1996 | Marshall | 372/22 |
| 5,521,932 | 5/1996 | Marshall | 372/36 |
| 5,574,740 | 11/1996 | Hargis et al. | 372/41 |
| 5,637,169 | * 6/1997 | Hull et al. | 264/401 X |
| 5,751,751 | 5/1998 | Hargis et al. | 372/41 |
| 5,774,489 | 6/1998 | Moulton et al. | 372/70 |
| 5,840,239 | * 11/1998 | Partanen et al. | 264/401 |
| 5,848,079 | * 12/1998 | Kortz et al. | 372/22 |

APPARATUS AND METHOD FOR FORMING THREE-DIMENSIONAL OBJECTS IN STEREOLITHOGRAPHY UTILIZING A LASER EXPOSURE SYSTEM WITH A DIODE PUMPED FREQUENCY-MULTIPLIED SOLID STATE LASER

This application is a continuation of Ser. No. 09/193,985, filed Nov. 18, 1998, now abandoned; which is a divisional of Ser. No. 08/792,347, filed Jan. 31, 1997, now U.S. Pat. No. 5,840,239 these applications are incorporated herein by reference.

FIELD OF THE INVENTION

This invention relates generally to the layer-by-layer formation of three-dimensional objects according to the principles of stereolithography. More particularly, it relates to stereolithographic exposure systems utilizing pulsed exposure of the medium by electromagnetic radiation.

BACKGROUND OF THE INVENTION

In recent years, many different techniques for the fast production of three-dimensional models have developed for industrial use, which are sometimes referred to as Rapid Prototyping and Manufacturing (RP&M) techniques. In general, RP&M techniques build a three-dimensional object, layer-by-layer, from a working material utilizing a sliced data set representing cross-sections of the object to be formed. Typically an object representation is initially provided by a Computer Aided Design (CAD) system.

Stereolithography, the presently dominant RP&M technique, may be defined as a technique for automated fabrication of three-dimensional objects from a fluid-like material utilizing selective solidification of thin layers of the material at a working surface to form and adhere successive layers of the object (i.e. laminae). In stereolithography, data representing the three-dimensional object is input as, or converted into, two dimensional layer data representing cross-sections of the object. Thin layers of material are successively formed and selectively transformed (i.e., cured) into successive laminae according to the two-dimensional layer data. During transformation the successive laminae are bonded to previously formed laminae to allow integral formation of the three-dimensional object.

A preferred material typically used in a Stereolithographic Apparatus (SLA) is a liquid photopolymer resin. Typical resins are solidifiable in response to selected wavelengths of electromagnetic radiation (e.g., selected wavelengths of ultraviolet (UV) radiation or visible light). This radiation of selected wavelength may be termed "solidifying radiation". The electromagnetic radiation is typically in the form of a laser beam which is directed to a target surface of the resin by way of two orthogonal computer controlled scanning mirrors. The scanning speed of the beam across the liquid surface is controlled so as to provide a desired exposure and associated depth of cure. A more detailed description of stereolithographic techniques (i.e. methods and apparatus) is found in the following patents and applications which are hereby incorporated by reference:

U.S. Pat. No. 4,575,330 to Hull:
  Describes the fundamentals of stereolithography.
U.S. Pat. No. 5,058,988 to Spence et al.:
  Describes the use of beam profiling techniques in stereolithography.
U.S. Pat. No. 5,059,021 to Spence et al.:
  Describes the use of scanning system drift correction techniques for maintaining registration of exposure positions on the target surface.
U.S. Pat. No. 5,104,592 to Hull et al.:
  Describes the use of various scanning techniques for reducing curl-type distortion in objects that are being formed stereolithographically.
U.S. Pat. No. 5,123,734 to Spence et al.:
  Describes a technique for calibrating a scanning system on a stereolithographic apparatus.
U.S. Pat. No. 5,133,987 to Spence et al.:
  Describes the use of a large stationary mirror in the beam path between the scanning mirrors and a target surface.
U.S. Pat. No. 5,182,056 to Spence et al.:
  Describes the simultaneous use of multiple wavelengths to expose the resin.
U.S. Pat. No. 5,184,307 to Hull et al.:
  Describes the use of slicing techniques for converting three-dimensional CAD data into cross-sectional data for use in exposing the target surface to appropriate stimulation.
U.S. Pat. No. 5,321,622 to Snead et al.:
  Describes the use of Boolean operations in deriving cross-sectional data from three-dimensional object data
U.S. Pat. No. 5,999,184, to Smalley et al.:
  Describes the use of solidification techniques to simultaneously cure multiple layers.
U.S. Pat. No. 5,965,079, to Gigl et al.:
  Describes various scanning techniques for use in stereolithography.

Commercially available photopolymers for use in Stereolithography are typically of acrylate, epoxy or combined chemistry. Typically, resins contain a plurality of components. These components may include one or more photoinitiators, monomers, oligomers, inert absorbers, and other additives. The usefulness of resins for stereolithography is in part determined by the photospeed of the resin and the ability of the resin to form adequately cohesive laminae of appropriate thickness. It is desired that the photospeed be high enough to enable rapid solidification of cross-sections with available power levels of solidifying radiation. Further, since the depth of polymerization in the resin is linked to the locations at which photons are absorbed, absorption of photons by the resin must be sufficient to form adequately thin layers. Examples of preferred photopolymers include, but are not limited to, SL 5170, SL 5180, SL 5081, SL 5154 and SL 5149 (manufactured by Ciba Specialty Chemicals Corporation North America of Los Angeles, Calif. and as sold by 3D Systems, Inc. of Valencia, Calif.), SOMOS 6100, 6110, 5100, 5110, 2100 and 2110 (manufactured by Du Pont Company, New Castle, Del.).

The photoinitiators are the component of the resin that determines the photosensitivity of the resin at a given wavelength. Radiation absorption by the photoinitiator leads to chemical changes in the photoinitiator which can cause polymerization of the monomers and oligomers. Thus, radiation of appropriate wavelengths to be absorbed by the photoinitiator is known as solidifying radiation. At some wavelengths the monomers/oligomers can absorb electromagnetic radiation. As absorption by the monomers/oligomers typically do not yield an efficient polymerization reaction, the absorption of solidifying radiation by the monomers/oligomers is typically undesired. Thus, the most effective wavelengths for use in stereolithography are those which are strongly absorbed by the photoinitiator (high coefficient of absorption) and only weakly absorbed by the monomers and oligomers (low coefficient of absorption). Examples of preferred photoinitiators include, but are not limited to, triarylsulfonium salts, mixtures of triarylsulfonium salts with phosphate salts or antimonate Salts; 2,2-dimethoxy-2-phenyl acetophenone (BDK) C $16H_{16}O_{16}$; 2,4, 6-trimethyl benzoyl diphenyl phosphine oxide (TPO); and 1-hydroxycyclohexyl phenyl ketone (HCPK) $C_{13}H_{16}O_2$.

Figure 1:
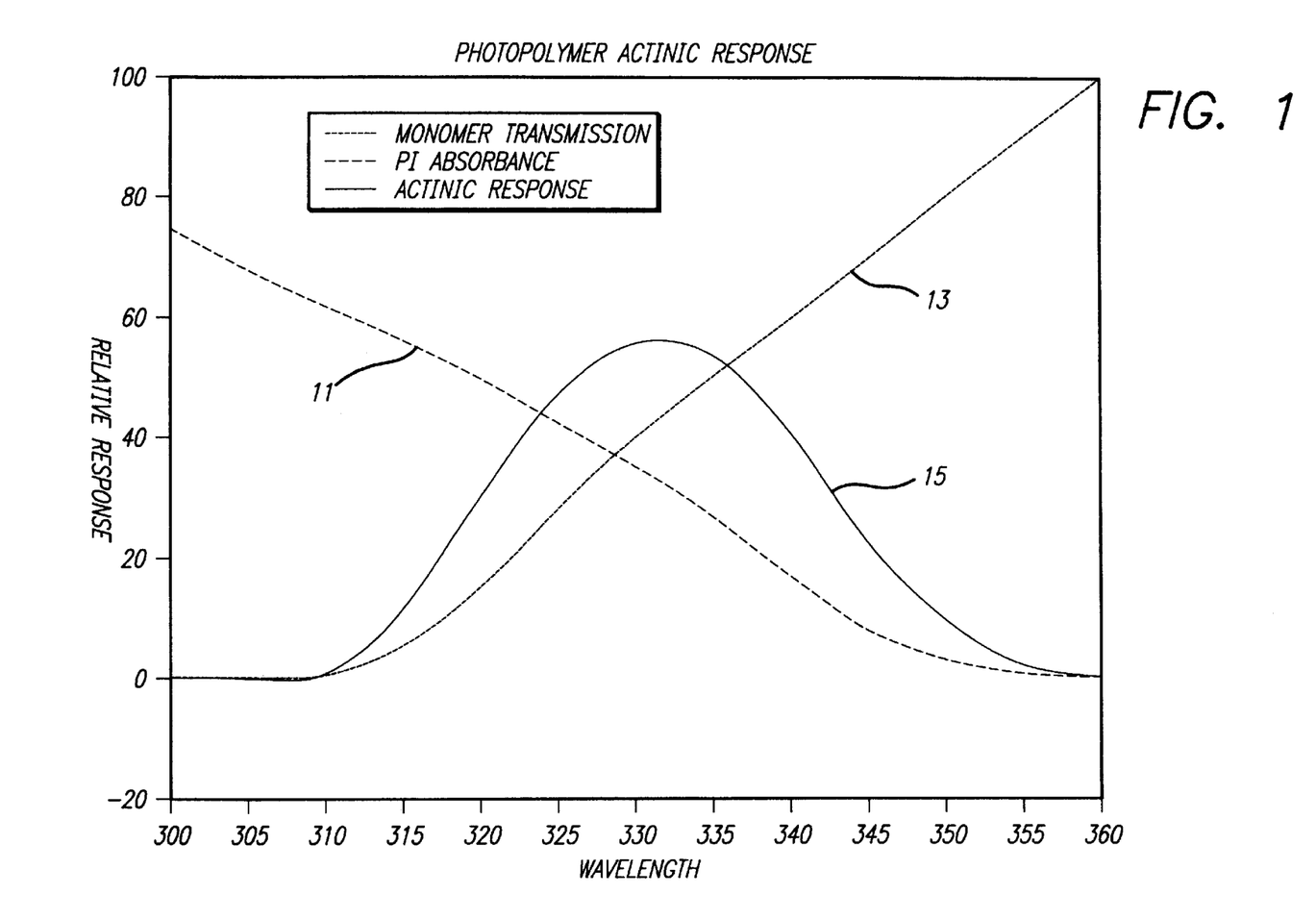
FIG. 1 is a spectral sensitivity curve depicting the relationship between the absorption of a photopolymer and the wavelength of the laser.

The useable wavelength range is bounded at the low wavelength end by monomer/oligomer absorption properties and at the upper wavelength end by photoinitiator absorption. As such, the reactive (i.e., actinic) spectral sensitivity of a photopolymer resin may be described as the product of the photoinitiator absorption spectrum and the monomer/oligomer transmission spectrum, as shown in FIG. 1. FIG. 1 depicts plots of photoinitiator absorption 11, monomer/oligomer transmission 13, and reactive sensitivity or reactive response 15 of the resin. As the absorption and transmission coefficients not only depend on the specific chemical composition of each component, but also on the concentrations of each component within the resin, shifts in wavelength for peak reactive response may result due to changes in either composition or concentration. For a given resin composition this peak can be readily determined by one of skill in the art.

In other words, the absorption by the monomer/oligomer, which depends upon the wavelength of radiation, affects the effectiveness of activitating the photopolymers as, in some instances, monomer/oligomer absorption competes with the absorption by the photoinitiator.

In the example of FIG. 1, the peak reactive response occurs within a range of about 328 nm–337 nm and the half maximum response falls within the range of about 320 nm to about 345 nm. As such, in this example electromagnetic radiation within the range of 320 to 345 nm is preferred and electromagnetic radiation within the range of 328 to 337 nm is even more preferred. The more preferred range includes the wavelengths which are within 10% of the peak reactive response. The preferred range includes wavelengths which are within 50% of the peak reactive response.

Until recently, all commercial Stereolithography systems used helium-cadmium (HeCd) lasers which emit radiation at 325 nm or argon-ion ($Ar^+$) lasers which emit radiation primarily at 351 nm. Table 1 illustrates key characteristics of present lasers.

TABLE 1

| Laser Type | Input Power | Emission Wavelength | Output Power | Output Type | Typical Lifetime |
|---|---|---|---|---|---|
| HeCd | <1 kW | 325 nm | 50–70 mW | CW | 5000 hrs |
| $Ar^+$ | 20–30 kW | 351 nm | 300–500 mW | CW | 4000 hrs |
| Present DPSS | <1 kW | 355 nm | 300–500 mW | Pulsed | 5000 hrs |

Helium-cadmium lasers have a wavelength, input power and output type which are suitable and acceptable for stereolithography. However, the output power from these lasers is very limited and unsuitable where large objects or faster build speeds are needed. Thus, although HeCd lasers are useful in Stereolithography, they do not achieve all of the needs of Stereolithography.

Argon-ion lasers have output power levels and output modes which are suitable for faster part building and/or larger Stereolithography parts. However, the input power is excessive, and necessitates the need for water cooling. Further, the emission wavelength is outside the preferred range and the lifetime is undesirable.

Present diode pumped solid state (DPSS) lasers have both input and output powers which are suitable for stereolithography. These lasers are pulsed in contrast to the prior gas lasers (e.g., HeCd and $Ar^+$) which provided a continuous wave (CW) laser beam. However, to effectively utilize these lasers a sufficiently high pulse repetition rate is needed to ensure that continuous cured lines of photopolymer are formed. Further, the emission wavelength of present DPSS lasers, though presently used in stereolithography, is outside the preferred range.

Recently, some commercial stereolithographic systems have been employed using pulsed solid state lasers to selectively solidify the material. These commercial systems have employed the use of frequency tripling to bring the 1064 nm fundamental infrared radiation of $Nd:YVO_4$ pulsed solid state lasers into the ultraviolet range. This frequency tripling has resulted in a wavelength of 355 nm. The effectiveness of this laser for use in stereolithography has been limited due to its output wavelength being outside both the more preferred range (i.e., 328–337 nm) and the preferred range (i.e., 320–345 nm).

Considering the preferred and more preferred wavelength ranges for stereolithography, as based on the example of FIG. 1, and considering that solid state lasers do not directly emit in these ranges, frequency multiplication of fundamental and secondary (i.e., wavelength resulting from first frequency multiplication) wavelengths are necessary to obtain the desired output wavelengths. Working backwards one can obtain the necessary fundamental wavelengths. To obtain wavelengths in the more preferred range one would need to start with wavelengths in the ranges of:

| | |
|---|---|
| For frequency doubling | 656–674 nm, |
| For frequency tripling | 984–1011 nm, |
| For frequency quadrupling | 1312–1348 nm. |

To obtain wavelengths in the preferred range one would need to start with wavelengths in the ranges of:

| | |
|---|---|
| For frequency doubling | 640–690 nm, |
| For frequency tripling | 960–1035 nm, |
| For frequency quadrupling | 1280–1380 nm. |

Thus, to obtain desired output wavelengths, one must start with an appropriate solid state lasing crystal with an output wavelength in one of the above ranges. In addition to starting with the appropriate wavelength, one must also consider other characteristics of the fundamental output of the lasing crystal such that effective conversion can occur and desired average power and pulse repetition rate is obtained. Such characteristics include pulse duration (i.e. the time width of the pulses that are produced), the emission cross-section of the crystal, and the excited state lifetime. Although sufficiently high power lasers of appropriate fundamental wavelength exist and are commercially available, frequency multiplying of these wavelengths within the preferred or more preferred wavelength range and at appropriate repetition rates has not been demonstrated.

Another factor to be considered is related to the scanning speed of the laser. For the cured line to be continuous and absent large modulations, the time between the laser pulses must be such that the solidified material overlaps or, at a minimum, meets.

For the foregoing reasons, a need exists in the stereolithography art for an efficient, long lived laser operating within the preferred or more preferred wavelength range, at power levels above 100 mW, and preferably above 300 mW, and operating at appropriate pulse repetition rates. It is desired that such a laser operate with an input power below 1 kW, an output power above 300 mW, an emission wavelength between 320 nm and 345 nm, and more preferably between 328–337 nm, a pulse repetition rate which depends on laser power but typically exceeds 20 kHz, and a lifetime above 10,000 hours.

SUMMARY OF THE DISCLOSURE:

An object of the invention is to provide a method of forming a 3D object from a solidifiable medium, comprising the steps of:

forming a coating of solidifiable medium adjacent to a previously formed lamina in preparation for forming a subsequent lamina of said object;

selectively exposing a target surface of said solidifiable medium to a beam of pulses of electromagnetic radiation, having a desired pulse repetition rate, to form a subsequent lamina of the object and to adhere said subsequent lamina to said previously formed lamina;

repeating the forming and exposing steps to form the three-dimensional object from a plurality of adhered laminae;

wherein the electromagnetic radiation has a wavelength within the range of wavelengths which have reactive responses which are within about 50% of the peak reactive response of the solidifiable medium; and wherein the pulse repetition rate is selected such that it results in a pulse separation at said target surface which is less than a diameter of said beam when said beam is being scanned at a desired velocity and an average exposure deposited by said beam is equal to a desired amount.

Another object of the instant invention is to produce an output wavelength conducive to the Stereolithographic process having an output power that allows large object building and efficient object building.

Another object of the invention is to design a laser apparatus that can be used in all Stereolithography apparatus.

Another object of the invention is to provide a source of pulsed electromagnetic radiation meeting the requirements of the first object set forth above, but further requiring that the wavelength of the electromagnetic radiation have a reactive response equal to or greater than about 90% of the peak reactive response of the medium.

Another object of the invention is to provide a solid state pulsed laser meeting the requirements of the first object stated above.

A further object of the invention is to provide a frequency quadrupled solid state laser with a Nd:YVO$_4$ lasing medium.

A still further object of the invention is to provide a frequency quadrupled solid state laser with a Nd:S-FAP lasing medium.

A further object of the invention is to produce an output wavelength in the preferred range, while operating with a required minimum pulse repetition rate for a desired scanning velocity and average beam power.

A further object of the invention is to provide a solid state pulsed laser producing an output wavelength in the more preferred range, while operating with a required minimum pulse repetition rate for a desired scanning velocity and average beam power.

The above and other objects of this invention will be apparent from the following more detailed description when taken in conjunction with the accompanying drawings of illustrative embodiments. It is intended that the above objects can be achieved separately by different aspects of the invention and that additional objects of the invention will involve various combinations of the above independent objects such that synergistic benefits may be obtained from combined techniques.

BRIEF DESCRIPTION OF THE DRAWINGS

The detailed description of the embodiments of the invention will be made with reference to the accompanying drawings, wherein like numerals designate corresponding parts in the several figures.

DETAILED DESCRIPTION OF THE EMBODIMENTS

Currently, commercially available solid state lasers operate in the red and infrared portion of the spectrum. Nonetheless, well known techniques for frequency converting the laser light from infrared to ultraviolet wavelengths exist. As the non-linear effects that lead to frequency conversion are proportional to the instantaneous power density, it is essential that the peak power be maximized to get the most efficient conversion possible. These frequency conversion techniques typically require, at a minimum, instantaneous power levels in the kilowatt range. The instantaneous powers referred to above are the ratio of the energy in each pulse to the duration of each pulse. The average power output of such lasers is determined, not just by the peak power level, but also by the number of pulses issued per second and by the duty cycle of the pulses (i.e. the pulse "on" time to total time). It is typical to use a Q-switching or mode locking technique to achieve high enough instantaneous power levels while maintaining average power levels at a desired amount (e.g. 100 mW to 1 W).

As noted above, in these conversion techniques the laser is operated in a pulsed mode. Typically, the pulse duration is 3 or 4 orders of magnitude shorter in time than the separation between pulses. Therefore, the instantaneous power in the pulses (i.e. peak power) is 3 or 4 orders of magnitude higher than the time averaged value of the power for the laser.

Embodiments of this invention utilize pulsed lasers as they are required to achieve the necessary instantaneous power levels to allow efficient frequency conversion to ultraviolet wavelengths such that desired output power can be obtained. As discussed above, in stereolithography, a thin beam of radiation (e.g. UV radiation) is drawn on the target surface (i.e., working surface) of the material. If the beam emanates from a pulsed laser, the curing of a continuous line requires that the material stimulated by successive pulses overlap sufficiently to ensure adhesion between successively solidified regions. As the pulse duration is typically very short, the movement of the beam during a pulse duration can be considered negligible. The spacing between successive pulses may be termed "step size". The step size is equivalent to the ratio of the beam velocity to the pulse repetition rate. As each pulse in the beam has a width and energy associated with it, when interacting with the resin, a particular deposition pattern of energy will occur. Where the deposited energy exceeds the critical exposure ($E_c$), solidification will occur. A single pulse of the beam will result in a bullet of solidified material, which is surrounded by partially polymerized but not yet gelled material (this is the region of subcritical exposure). If two pulses occur close together such that their individual subcritical regions of exposure overlap, adhesion between the otherwise independent bullets might occur if the region between the bullets has received sufficient energy from the two pulses to exceed $E_c$. Typically the step size is equal to or less than the width of cure from a single pulse. However, as adhesion might occur at even a somewhat wider spacing due to overlapping regions of subcritical exposure, in some cases it is possible to use a larger step size. Preferably, the step size is less than half the width of cure from a single pulse (i.e., the half width of an individual bullet). Thus, the maximum scanning velocity for the beam is dictated by the pulse repetition rate and the effective width of the beam (i.e., the width of cure associated with a single pulse). This point is illustrated in FIGS. 2a, 2b and 2c.

Figure 2A:
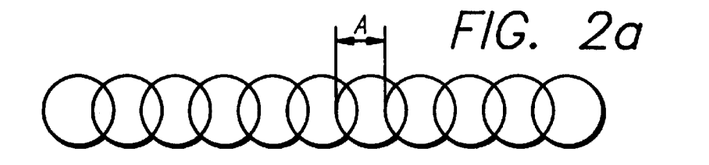
FIG. 2a depicts a continuous cure by successive laser pulses separated by a distance which is less than the width of the beam.
Figure 2B:
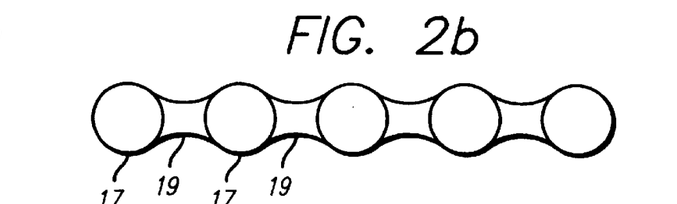
FIG. 2b depicts a continuous cure from pulses with step size greater than the width of a beam.
Figure 2C:
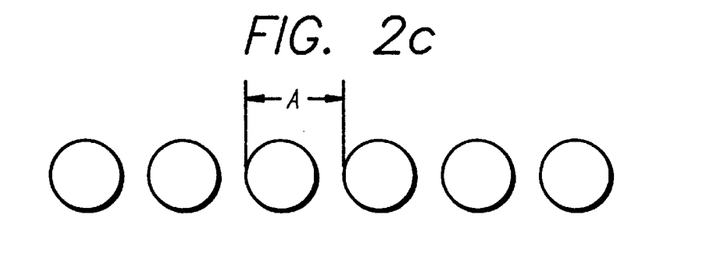
FIG. 2c depicts a discontinuous cure by successive laser pulses.

FIG. 2a depicts a preferred embodiment wherein two successive pulses are separated by less than the effective width of the beam. In one preferred embodiment, the two pulses are separated by one half of the effective width of the beam. In other preferred embodiments, other distances between pulses that achieve continuous cure, such as, but not limited to, the full width, three-fourths the width, and one-fourth the width can be utilized. FIG. 2b depicts the case in which pulses are separated a distance greater than the effective beam width, but wherein the subcritical regions sufficiently overlap to exceed the critical exposure $E_c$ and form a continuous cured line. Element 17 depicts the individual bullets solidified by individual pulses and element 19 depicts the regions where the subcritical exposure from individual pulses combines to exceed $E_c$ and produce solidified material. FIG. 2c depicts the case in which the pulse separation, A, is too large such that the cure is not continuous.

As stated above, in addition to the width of the beam, the cure depth is dependent upon the peak intensity of the beam, the pulse width and the scanning velocity. The minimum depth of cure is a function of the minimum exposure, wherein the minimum exposure is the exposure associated with a single pulse of the beam. When using CW lasers, the minimum exposure is proportional to the ratio of intensity to velocity. Therefore, when using a CW laser, the cure depth can be minimized by maximizing the scanning velocity, which, in effect, is only limited by the performance of the scanning system. In contrast, with a pulsed laser, one must be concerned with both the formation of a continuous line and the achievement of minimum cure depth. Therefore, the minimization of cure depth with a pulsed laser requires, not only maximizing velocity, but also, maximizing pulse repetition rate.

Using the theory for stereolithographic exposure, as explained in the reference by P. F. Jacobs, "Fundamental Processes," *Rapid Prototyping & Manufacturing: Fundamentals of Stereolithography*, Ed: P. F. Jacobs. pp. 79–110, Society of Manufacturing Engineers, Dearborn, Mich., 1992, incorporated herein by reference, and based on an assumption of desired overlap, one can derive an equation for the minimum pulse repetition rate. For example, in the case wherein the pulses are separated by one half of the beam width, the following equation can be derived:

$$F = \frac{V_s}{W_0} = \sqrt{\frac{2}{\pi}} \frac{P_L}{E_c W_0^2} \exp\left(-\frac{C_d}{D_p}\right) \tag{1}$$

wherein $V_s$ is the scanning speed at which the laser spot moves across the layer to be solidified, $W_0$ is the half width of the laser spot at $1/e^2$ of the peak of the assumed Gaussian laser irradiance distribution, $P_L$ is the laser power, $E_c$ is the critical (threshold) exposure of the resin corresponding to the transition from the liquid phase to the solid phase, $C_d$ is the cure depth, and $D_p$ is the penetration depth (1/e absorption depth) of the laser beam in the resin.

As described above, FIG. 1 is a graph depicting the reactive spectral sensitivity curve. The reactive spectral sensitivity curve shown in FIG. 1 illustrates that a preferred laser source for stereolithography would have an emission wavelength between about 320 nm and 345 nm and that a more preferred laser source would have an emission wavelength between about 328 nm and 337 nm. Beams at shorter wavelengths will become absorbed in the monomer/oligomer and other non-actinic elements of the photopolymer, while beams at longer wavelengths have longer penetration depths. Photopolymers have been engineered to respond to longer wavelengths than that specified in the preferred range, (e.g., 355 nm), however these photopolymers require the addition of larger concentrations of photoinitiator which has negative consequences. For example, such consequences include reduced green strength of parts during the build process, increased resin development difficulty, and higher photopolymer costs.

As stated above, the preferred wavelength range of 320 nm–345 nm is preferred for stereolithography. Within this range, about 328 nm to about 337 nm is more preferable so that the amount of photoinitiator needed is minimized. In one preferred embodiment, about 335.5 nm radiation is obtained through the quadrupling of the 1342 nm fundamental line of a Nd:YVO$_4$ laser by use of two frequency doubling crystals, i.e., two second harmonic crystals.

Figure 3:
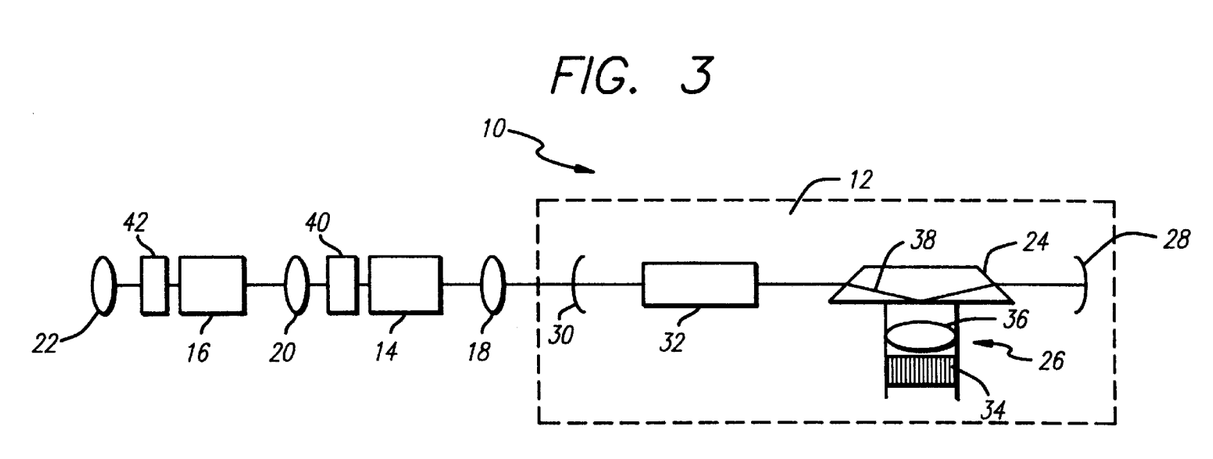
FIG. 3 depicts a preferred embodiment of a side pumped diode pumped solid state laser having a fourth harmonic generator.

FIG. 3 depicts a preferred embodiment of a UV laser assembly 10. The embodiment depicted in FIG. 3 comprises a laser oscillator 12, two frequency doubling crystals 14, 16, wherein the first crystal 14 is for frequency doubling from 1342 nm to 671 nm, while the second crystal 16 is for frequency doubling the 671 nm line to about a 335 nm line. Various lenses 18, 20, 22 are included for focusing and collimation.

The laser oscillator 12 further comprises a laser crystal 24, a diode assembly 26, a laser cavity having a first and a second end mirror 28, 30 and a Q-switch 32. In this embodiment, the laser oscillator 12 is side pumped.

The diode assembly 26 is used to excite the laser crystal 24. In this preferred embodiment, the diode assembly 26 includes a diode bar 34 that emits 808 nm radiation at 20 W. In preferred embodiments, the diode bar 34 is model number SDL-3470-S, manufactured by SDL of San Jose, Calif., although any diode bar that is capable of emitting wavelengths between 808 nm±5 nm will be suitable. In some embodiments, more than one diode bar may be included in the diode assembly 26.

The 808 nm radiation emitted from the diode bar 34 is imaged onto the laser crystal 24 by imaging members 36. The imaging member 36 include members, such as, but not limited to, lenses and fiber lenses. The radiation emitted from the diode bar is used to excite the dopant in the crystal and produce a population inversion within the crystal which is the source optical gain for the laser oscillator 12.

In one preferred embodiment, the laser crystal that receives the 808 nm radiation is a Nd:YVO$_4$, i.e., Neodymium Doped Yttrium Vanadate. The Nd:YVO$_4$ crystal pumped by 808 nm radiation generates and amplifies a variety of wavelengths, including a dominant line at 1064 nm and a secondary line at 1342 nm. In one preferred embodiment, all of the wavelengths generated by the crystal are suppressed, except the radiation emitted at 1342 nm.

In another preferred embodiment, the crystal that receives the 808 nm radiation from the diode is a Nd:S-FAP, i.e., Neodymium Doped Strontium Fluorapatite. In this embodiment, all of the wavelengths generated by the crystal are suppressed except radiation at 1328 nm. When this line is quadrupled, a 332 nm wavelength is obtained.

The laser crystal 24 in FIG. 3 further includes a single bounce pumping geometry 38. A single bounce pumping geometry 38 is achieved by designing the crystal faces such that they direct the cavity beam through the crystal 24 with one total internal reflection, wherein the cavity beam, as used herein, is defined as the cavity mode which is the result of the laser action. The diode assembly 26 directs the pumping beam, i.e., the beam used to excite the crystal 24, to the crystal face which is involved in the total internal reflection. A description of a single bounce geometry can be found in U.S. Pat. No. 5,315,612 to Alcock et. al and the publication by J. E. Bernard & A. J. Alcock, *High-Efficiency diode-pumped Nd:YVO$_4$ slab laser*, Optics Letters, Vol. 18, No. 12 (1993), which are incorporated herein by reference. The crystal faces are anti-reflection coated for both the 1342 nm and 1064 nm radiation.

Figure 4A:
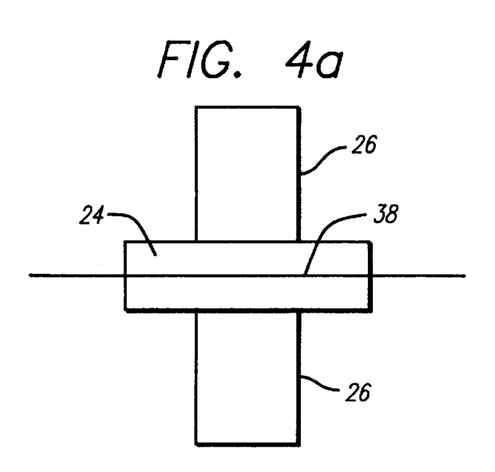
FIG. 4a depicts a crystal having a straight pumping geometry.
Figure 4B:
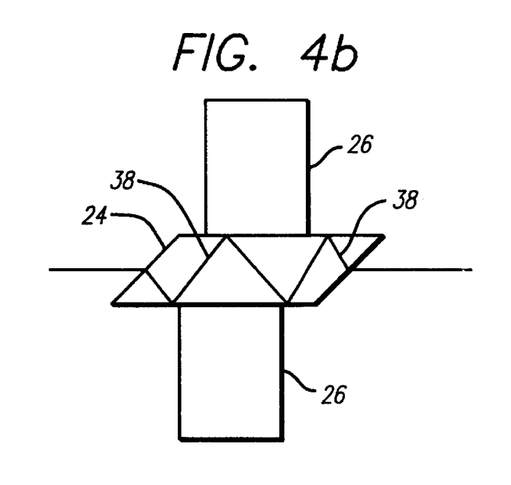
FIG. 4b depicts a crystal having a zig-zag pumping geometry.

In alternative preferred embodiments, the laser crystal 24 is designed in a manner such that the beam path is straight, as depicted in FIG. 4a, or zig-zagged, as depicted in FIG. 4b. In these embodiments, a single or a plurality of pumping diode assemblies 26 can be used to excite laser crystal 24.

The laser cavity is bounded by a first and second end mirror 28, 30, wherein the first end mirror 28 is highly reflective at 1342 nm and the second mirror 30 operates as an output coupler. The optimal values for reflectivity and transmission of the mirrors 28, 30 can be determined by one of skill in the art using the procedure explained in the publication by V. Magni, *Resonators for Solid State lasers with large-volume fundamental mode and high alignment stability*, Applied Optics, Vol. 25, No. 1 (1996), which is herein incorporated by reference. Both the first and second end mirrors 28, 30 are anti-reflection coated for 1064 nm to suppress oscillation at this wavelength.

The curvatures of the first and second end mirrors 28, 30 are determined such that a stable laser cavity mode is created. A description of various methods for determining optimal curvature values, which include consideration of thermal lensing inside the crystal, is found in the Magni publication referenced above.

The Q-switch 32 resides within the cavity 27 along the optical path. The Q-switch 32 causes the laser cavity to operate as a repetitively pulsed laser as required by the frequency conversion technique described above. In one preferred embodiment, the Q-switch 32 is an acousto-optic modulator, AOM. In other preferred embodiments, a mode locked cavity is used.

In either the case of mode locking or Q-switching, the AOM is used as a controllable loss device to allow laser oscillation within the laser cavity. In the case of mode locking, the AOM transmission is modulated at a frequency equal to the frequency at which light completes a round trip within the laser cavity (usually several hundred megahertz). In the case of Q-switching, the AOM transmission is modulated at a selected frequency, which is the pulse repetition frequency.

The output beam from the laser cavity is directed through a first lens assembly 18 into the first crystal 14. The first lens assembly 18 includes at least one lens, but may include a plurality of lenses. As noted above, crystal 14 is designed for doubling the frequency of the incoming laser beam. Current methods for establishing optimal geometries, e.g., phase matching, for frequency doubling is described in the reference by V. G. Dmtriev, G. G. Gurzadyan, D. N. Nikogosyan, *Handbook of Nonlinear Optical Crystals* (1991), which is incorporated herein by reference.

In one preferred embodiment, the crystal 14 is lithium borate (LBO), having plane-parallel surfaces which are polished and AR-coated at 671 and 1342 nm. It is believed that the crystal 14 should be approximately 16 mm in length, or any other length suitable to provide sufficient conversion efficiency, and should have a Type II NCPM phase matching angle. Other types of suitable second harmonic crystals, include, but are not limited to, KTP, LiIO$_3$ and DCDA. These crystals are available from, for example, CASIX of Monrovia, Calif., Litton Airtron of Charlotte, N.C. and Union Carbide of Washougal, Wash.

The beam, as it exits crystal 14 passes through a first dichroic element 40. The frequency doubled component of the beam at 671 nm passes through the first dichroic element 40 and the original component of the beam at 1342 nm is either reflected or absorbed, depending upon the specific type of dichroic element. In embodiments where the beam path is folded (not shown), the dichroic element 40 may reflect the doubled component of the beam at 671 nm and may transmit the fundamental component of the beam at 1342 nm.

The output beam from the dichroic element 40 is directed through a second lens assembly 20 into the second crystal 16. The second lens assembly 20 includes at least one lens, but may include a plurality of lenses. This crystal 16 is designed for doubling the frequency of the incoming 671 nm beam. It is believed that the crystal 16 should be approximately 10 mm in length, or any other length suitable to provide sufficient conversion efficiency. Current methods for establishing optimal geometries, e.g., phase matching, for frequency doubling is described in the Dmtriev reference as noted above.

In preferred embodiments, crystal 16 is LBO, Type II crystal. Other suitable crystals, include, but are not limited to, LiIO$_3$, LBO Type I, CLBO Type I and BBO crystals.

After the beam exits crystal 16, it passes through a second dichroic element 42. The frequency doubled component of the beam at 335 nm passes through the second dichroic element 42 and the original component of the beam at 671 nm is either reflected or absorbed, depending upon the specific type of dichroic element. In embodiments wherein the beam path is folded (not shown), the dichroic element 42 may reflect the doubled component of the beam at 335 nm and may transmit the fundamental component of the beam at 671 nm.

The beam exiting the dichroic element 42 passes through a third lens assembly 22 and is collimated. The third lens assembly 22 includes at least one lens, but may include a plurality of lenses.

In some preferred embodiments, the doubling crystal 14 resides inside the laser cavity. In this instance, the second end mirror 30 (i.e., the output coupler), is highly reflective at the wavelength of 1342 nm and highly transmissive at 671 nm. If the crystal 14 resides within the laser cavity 27 the first lens 18 and the first dichroic element 40 is not included in the assembly 10.

As noted above, FIG. 3 depicts a basic schematic of one preferred embodiment of the assembly 10. Nonetheless, variations can be included in the assembly such as, but not limited to, folding the cavity and providing additional mirrors and lenses for optimal beam manipulation.

Figure 5:
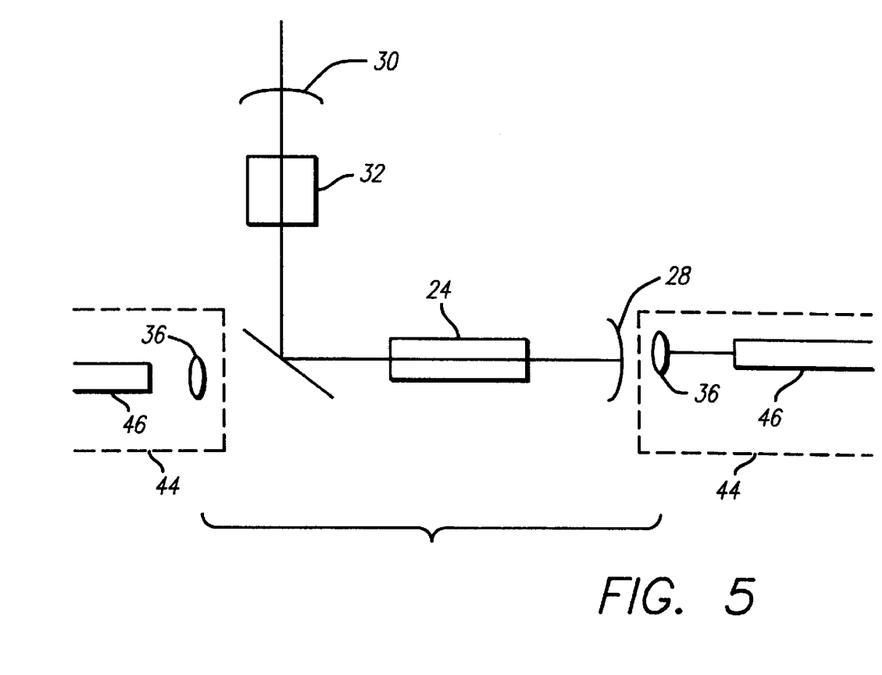
FIG. 5 depicts a preferred embodiment of the laser cavity wherein the laser cavity is end pumped.

FIG. 5 depicts another preferred embodiment of the laser oscillator 12, wherein the laser oscillator 12 is end pumped and folded. In this embodiment, the two diode assemblies 44 direct the pumping beam onto the laser crystal 24 through the same location where the cavity beam path strikes the crystal. In some preferred embodiments, only one end pump is used.

The diode assemblies 44 shown in FIG. 5 include diode bars (not shown) and beam shaping optics 46, wherein the beam shaping optics 46 include, for example, fiber bundles, and imaging and focusing optics. In some preferred embodiments, such as the one shown in FIG. 5, the end of the fiber bundle is focused onto the laser crystal utilizing focusing optics 36, i.e., a lens assembly. In other preferred embodiments, the beam shaping optics include, but are not limited to, a "lens duct" which is sold by VLOC, Tarpon Springs, Fla. Other beam shaping optics techniques are described in the reference by W. A. Clarkson & D. C. Hanna, *Efficient Nd:YAG Laser end pumped by a 20-W diode-laser bar*, Optics Letters, Vol. 12, No. 12 (1996), which is hereby incorporated by reference.

Figure 6:
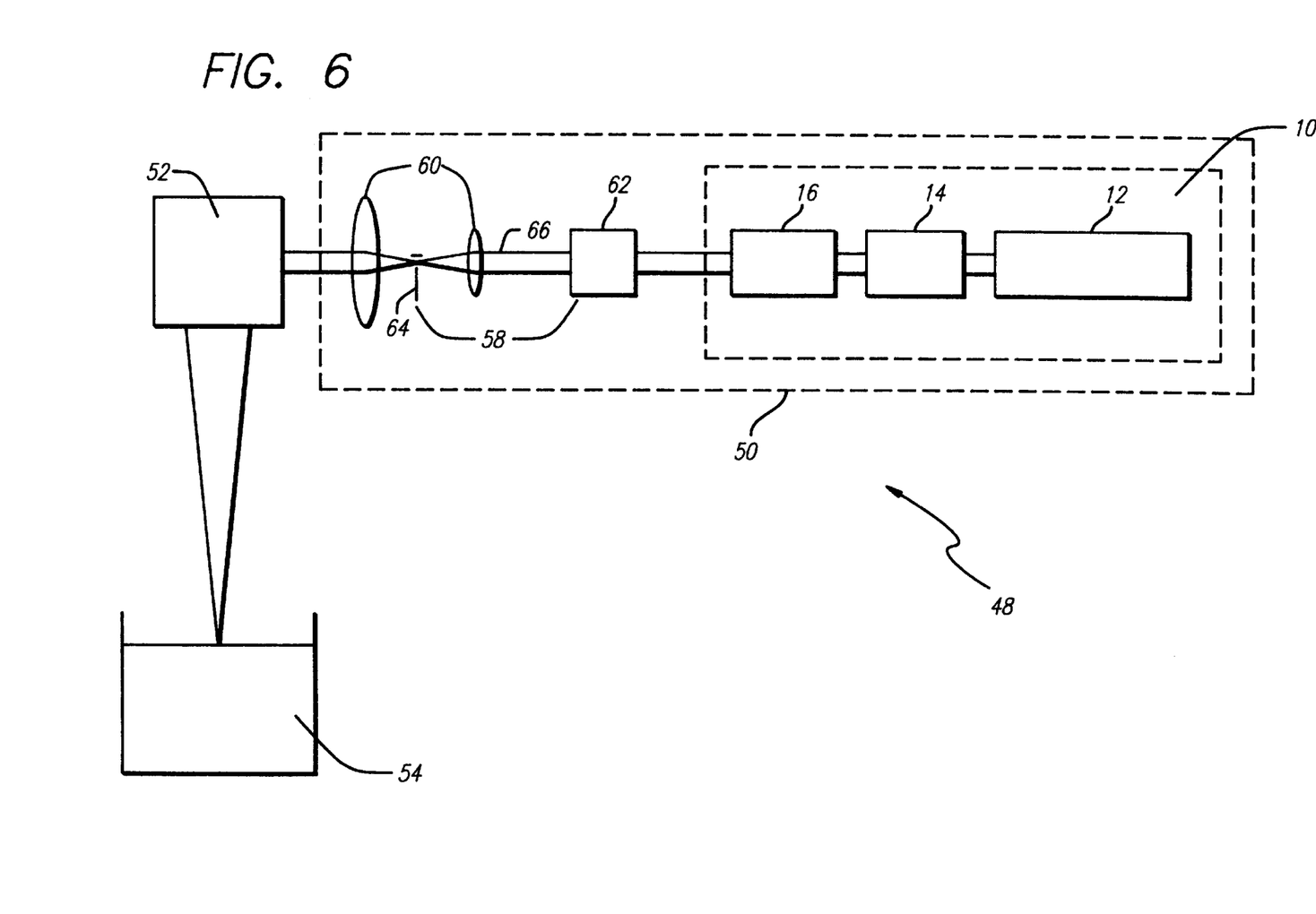
FIG. 6 depicts a preferred embodiment of a Stereolithography Apparatus, including a laser exposure assembly.

FIG. 6 depicts a preferred embodiment of a stereolithography apparatus 48, including a laser exposure assembly 50, scanning apparatus 52 and a photopolymer vat 54. As shown in FIG. 6, the laser exposure assembly 50 includes a UV laser assembly 10, an acousto-optic fast shutter 58 and beam expander 60. In some preferred embodiments, the laser exposure assembly 50 is manufactured as a single unit that is aligned during the manufacturing process with special tooling. In other preferred embodiments, it is believed that the AOM, located inside the laser cavity, may be used as the fast shutter as well as the Q-switch.

The acousto-optic fast shutter 58 includes an acousto-optic modulator 62 and a beam stop 64. The fast shutter action is achieved by the modulator 62 steering the beam 66 into the beam stop 64 when the beam is to be inhibited from reaching the target surface of the material. In the open position, the acousto-optic modulator 62 is not energized and the beam passes the beam stop and continues to propagate to the target surface of the photopolymer in vat 54. In some preferred embodiments, the acousto-optic modulator 62 is placed either between the harmonic crystals 14, 16, or after the laser oscillator 12 and before the first harmonic crystal 14. In these embodiments, the shutter action is accomplished by the AOM steering the beam out of the phase matching conditions, thus, eliminating the necessity for the beam stop 64.

The beam expander 60 is used to initially expand the beam such that it can be focussed to a small spot at the working surface of the liquid photopolymer. Thus, accurate object building can be achieved.

Figure 7:
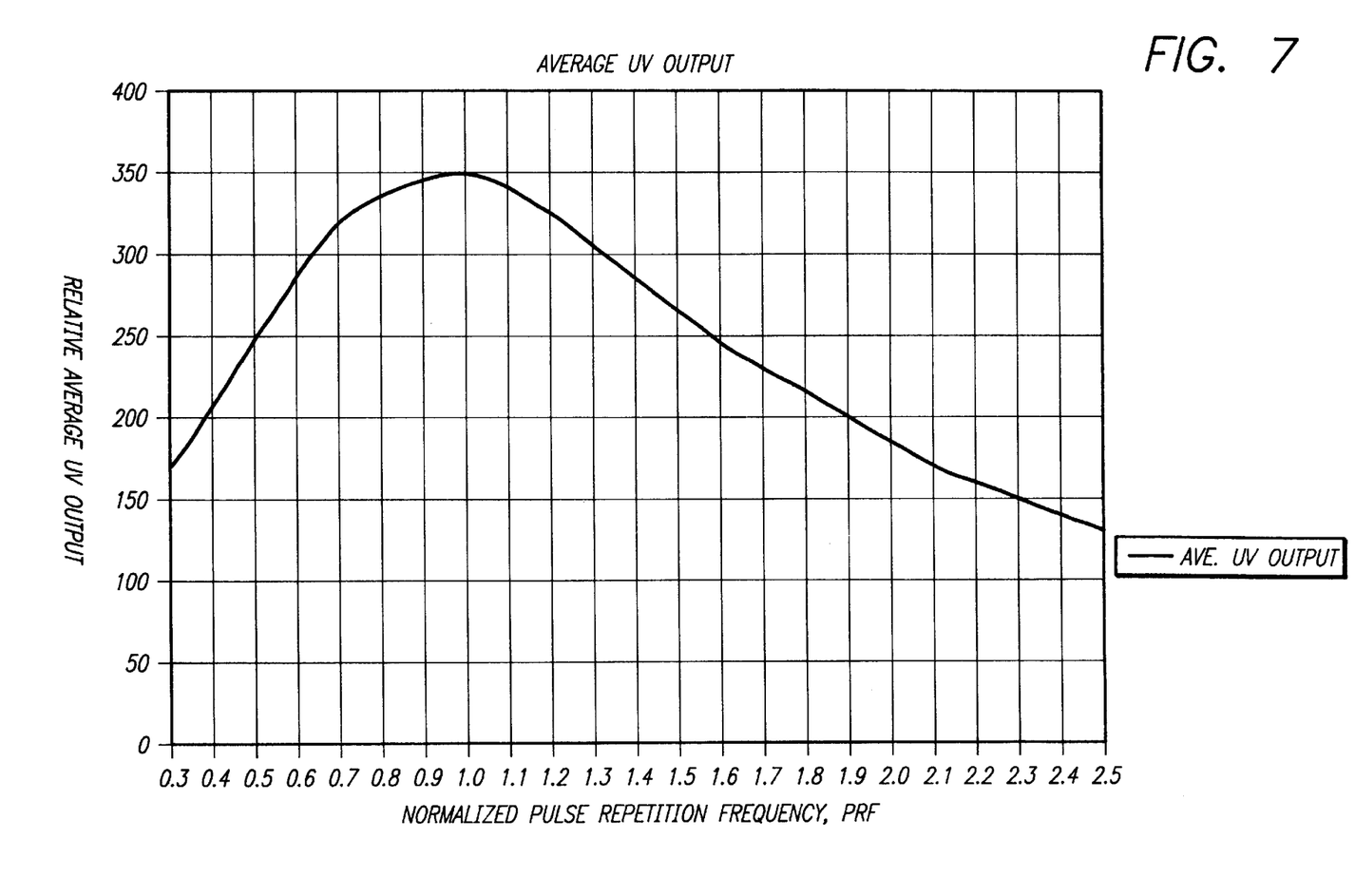
FIG. 7 is a graph depicting the relationship between the frequency converted UV output power and the normalized pulse repetition frequency of a CW diode laser pumped solid state laser.

FIG. 7 is a graph depicting the relationship between the average UV output of harmonically generated UV solid state lasers (frequency tripled or quadrupled), $P_{ave}$, and the normalized pulse repetition frequency, PRF, of a continuously diode pumped, repetitively Q-switched, solid state laser. The IR output of the continuously pumped, repetitively Q-switched, solid state laser increases monotonically with PRF. However, the pulse width markedly increases and the peak pulse output markedly decreases in the IR when the PRF exceeds a value equal to the reciprocal of the excited state lifetime of the lasing medium. Because of this, the average UV output increases with PRF until the critical PRF is reached and then it decreases. This maximum average UV output power is achieved at a PRF which is approximately equal to 2.5 divided by the excited state lifetime in seconds. This is explained further in the reference by Koechner, *Solid-State Laser Engineering*, Chapter 8, published by Springer-Verlag, Berlin (3d. 1992), which is hereby incorporated by reference.

As explained above, a requirement exists for a minimum pulse repetition rates so that a continuous cure can be achieved at a desired scanning velocity for a given beam width. Table 2 illustrates this point.

TABLE 2

| Bullet Width (width of resin solidified by one pulse) | Desired Average Percentage of Overlap | Desired Scanning Speed | Minimum Pulse Repetition Rate |
|---|---|---|---|
| 10 mil (0.254 mm) | 50% | 10 inch/second | 2 KHz |
| 10 mil (0.254 mm) | 50% | 100 inch/second | 20 KHz |
| 10 mil (0.254 mm) | 50% | 1000 inch/second | 200 KHz |
| 10 mil (0.254 mm) | 25% | 10 inch/second | 1.33 KHz |
| 10 mil (0.254 mm) | 25% | 100 inch/second | 13.3 KHz |
| 10 mil (0.254 mm) | 25% | 1000 inch/second | 133.3 KHz |
| 10 mil (0.254 mm) | 75% | 10 inch/second | 4 KHz |
| 10 mil (0.254 mm) | 75% | 100 inch/second | 40 KHz |
| 10 mil (0.254 mm) | 75% | 1000 inch/second | 400 KHz |
| 5 mil (0.127 mm) | 75% | 10 inch/second | 8 KHz |
| 5 mil (0.127 mm) | 75% | 100 inch/second | 80 KHz |
| 5 mil (0.127 | 75% | 1000 inch/second | 800 KHz |

It is assumed that the average laser power and the energy per pulse are appropriately related to the critical exposure and penetration depth of the resin such that the desired minimum cure depth is achieved when using the above exposure parameters. Higher levels of exposure and associated deeper depths of cure can be achieved by reducing the scanning velocity and thereby effectively increasing the average percentage of overlap.

Of the commercially available solid state laser crystals used for diode pumped solid state lasers: Nd:YVO$_4$ has an excited state life time of about 100 μs and has a maximum UV output at either 335 nm (4th harmonic of 1342 nm) or 355 nm (3rd harmonic of 1063 nm) which occurs at a pulse repetition rate of about 25 KHz; Nd:S-FAP has an excited state lifetime at about 190 μs and has a maximum UV output at 332 nm (4th harmonic of 1328 nm) which occurs about a pulse repetition rate of 13.2 KHz; Nd:YAG has an excited state lifetime at about 240 μs and has a maximum UV output at 328 nm (4th harmonic of 1319 nm) or 355 nm (3rd harmonic 1064 nm) which occurs about 10.4 kHz; and Nd:YLF has an excited state lifetime at about 480 μs and has a maximum UV output at 349 nm or 351 nm (3rd harmonic of 1047 nm or 1053 nm, respectively) which occurs about 5 KHz. As seen from above, excited state life time values and associated pulse repetition rates at maximum UV power levels values, Nd:YVO$_4$ and Nd:S-FAP are preferred crystals, since they allow higher pulse repetition rates before starting to lose efficiency. Of course, the other crystals may also be used.

Most preferred pulse repetition rates are greater than or equal to 30 kHz, preferred pulse repetition rates are greater than or equal to 20 kHz, and acceptable pulse repetition rates are greater than or equal to 10 kHz. These pulse rates allow reasonable overlap of individual pulses while maintaining reasonable scanning speeds. Table 3 depicts the pulse rates available from various lasing media while maintaining average UV output at or above 50% of the maximum UV output possible.

TABLE 3

| Lasing Medium | Min PRF at 50% | PRF at 100% | Max PRF at 50% |
|---|---|---|---|
| Nd:YVO$_4$ | 9 KHz | 25 KHz | 49 KHz |
| Nd:S-FAP | 5 KHz | 13.2 KHz | 26 KHz |
| Nd:YAG | 4 KHz | 10.4 KHz | 20 KHz |
| Nd:YLF | 2 KHz | 5 KHz | 10 KHz |

Another factor affecting the efficiency of the laser (i.e., gain of the crystal) is the stimulated emission cross-section of the dopant in the crystal. The higher the stimulated emission cross-section, the higher the gain. Thus, crystals with higher stimulated emission cross-sections at appropriate wavelengths are preferred. In preferred embodiments, stimulated emission cross-sections are greater than $1\times10^{-19}$ cm$^2$. Nd:YVO$_4$ has a stimulated emission cross-section above $5\times10^{-19}$ cm$^2$. Nd:S-FAP is believed to have a stimulated emission cross-section greater than $2\times10^{-19}$ cm$^2$. Both Nd:YAG and Nd:YLF do not have stimulated emission cross-sections greater than $1\times10^{-19}$ cm$^2$ when considering wavelengths that can be frequency multiplied into the preferred or more preferred wavelength ranges.

Due to crystals of Nd:YVO$_4$ being able to produce frequency multiplied wavelengths in the more preferred wavelength range, the excited state lifetime allowing efficient high frequency PRF utilization, and the large emission cross-section, this is the most preferred lasing crystal for use in embodiments of the instant invention. Similarly, due to the Nd:S-FAP crystals being able to produce frequency multiplied wavelengths in the more preferred wavelength range, the excited state lifetime allowing efficient reasonably high frequency PRF utilization, and reasonable emission cross-section, this is also a preferred lasing crystal for use in embodiments of the instant invention.

It will be apparent to one of skill in the art that various modifications can be made to the disclosed embodiments. For example, though primarily only a fourth harmonic generation is addressed in the above embodiments, the principle taught herein can be applied to third harmonic generation and to second harmonic generation from appropriate wavelengths.

Although the foregoing described the invention with regard to a preferred embodiment, this is not intended to limit the invention. Rather, the invention is intended to cover all modifications and alternative constructions falling within the spirit and scope of the invention as expressed in the appended claims.

What is claimed is:

1. A stereolithography apparatus for forming a three-dimensional object from a solidifiable medium, the apparatus comprising:
    a vessel adapted to hold a solidifiable medium, the solidifiable medium having a target surface defined in or on the solidifiable medium, the three-dimensional object formed layer by layer at least partially, within the vessel;
    a pulsed source of electromagnetic radiation; and
    a scanner receiving a beam of electromagnetic radiation from the pulsed source and moving the beam with respect to the target surface in a predefined manner, the scanner exposing the target surface of the solidifiable medium to the beam of pulses of electromagnetic radiation having a desired pulse repetition rate to form a subsequent layer of the three-dimensional object and to adhere the subsequent layer to a previously formed layer,
    wherein the pulse repetition rate F is selected to be equal to or greater than that given by $$F = \frac{V_s}{W_o} = \sqrt{\frac{2}{\pi}} \frac{P_L}{E_c W_o^2} \exp\left(-\frac{C_d}{D_p}\right),$$

wherein $V_s$ is a scanning speed of the beam, $W_o$ is a half width of the beam at $1/e^2$ of a peak irradiance distribution of the beam, $P_L$ is a power of the beam, $E_c$ is a critical exposure of the solidifiable medium, $C_d$ is a desired cure depth, and $D_p$ is a penetration depth (1/e absorption depth) of the beam in the solidifiable medium.

2. A stereolithography apparatus for forming a three-dimensional object from a solidifiable medium, the apparatus comprising:
    a vessel adapted to hold a solidifiable medium, the solidifiable medium having a target surface defined in or on the solidifiable medium, the three-dimensional object formed layer by layer at least partially within the vessel;
    a pulsed source of electromagnetic radiation; and
    a scanner receiving a beam of electromagnetic radiation from the pulsed source and moving the beam with respect to the target surface, the scanner exposing the target surface of the solidifiable medium to the beam of pulses of electromagnetic radiation having a desired pulse repetition rate to form a subsequent layer of the three-dimensional object and to adhere the subsequent layer to a previously formed layer,
    wherein the pulse repetition rate is selected to result in a pulse separation at the target surface less than or equal to an effective width of the beam when the beam is being scanned at a desired velocity and an average exposure provided by the beam is equal to a desired amount.

3. The apparatus of claim 2, wherein the electromagnetic radiation has a wavelength within the range of wavelengths having reactive responses within about 50% of the peak reactive response of the solidifiable medium.

4. The apparatus of claim 3, wherein the electromagnetic radiation is produced by a solid state laser.

5. The apparatus of claim 4, wherein a stimulated emission cross-section for the fundamental wavelength yielding the wavelength of electromagnetic radiation is greater than $1\times10^{-19}$ cm$^2$.

6. The apparatus of claim 3, wherein the wavelength of the electromagnetic radiation is in the range of 320–345 nanometers.

7. The apparatus of claim 3, wherein the wavelength of the electromagnetic radiation is in the range of 328–337 nanometers.

8. The apparatus of claim 3, wherein the electromagnetic radiation is obtained from a frequency quadrupled Q-switched 1342 nanometer Nd:YVO$_4$ laser providing an output wavelength of approximately 335 nanometer.

9. The apparatus of claim 3, wherein the electromagnetic radiation is obtained from a frequency quadrupled Q-switched 1328 nanometer Nd:S-FAP laser providing an output wavelength of approximately 332 nanometer.

10. The apparatus of claim 2, wherein the pulse repetition rate is greater than 10 kHz.

11. The apparatus of claim 2, wherein the pulse repetition rate is greater than 20 kHz.

12. The apparatus of claim 2, wherein the pulse repetition rate is greater than 30 kHz.

13. The apparatus of claim 2, wherein the effective width of the beam is equal to a width of cure associated with a single pulse of the beam of pulses.

14. A stereolithography apparatus for forming a three-dimensional object from a solidifiable medium, the apparatus comprising:

a vessel adapted to hold a solidifiable medium, the solidifiable medium having a target surface defined in or on the solidifiable medium, the three-dimensional object formed layer by layer at least partially within the vessel;

a pulsed source of electromagnetic radiation; and a scanner receiving electromagnetic radiation in a beam from the pulsed source and moving the beam with respect to the target surface, the scanner exposing the target surface of the solidifiable medium to the beam of pulses of electromagnetic radiation having a desired pulse repetition rate to form a subsequent layer of the three-dimensional object and to adhere the subsequent layer to a previously formed layer, wherein the electromagnetic radiation has a wavelength within the range of wavelengths having reactive responses within about 50% of the peak reactive response of the solidifiable medium.

15. A stereolithography apparatus for forming a three-dimensional object from a solidifiable medium, the apparatus comprising:

a vessel adapted to hold a solidifiable medium, the solidifiable medium having a target surface defined in or on the solidifiable medium, the three-dimensional object formed layer by layer at least partially within the vessel;

a pulsed source of electromagnetic radiation; and a scanner receiving electromagnetic radiation in a beam from the pulsed source and moving the beam with respect to the target surface, the scanner exposing the target surface of the solidifiable medium to the beam of pulses of electromagnetic radiation having a desired pulse repetition rate to form a subsequent layer of the three-dimensional object and to adhere the subsequent layer to a previously formed layer, wherein exposure of the solidifiable medium to a pulse of the beam results in a subcritical region of partially polymerized solidifiable medium adjacent to a solidified portion of the solidifiable medium; and wherein the pulse repetition rate is selected to result in a pulse separation at the target surface to be greater than an effective width of the beam and wherein the subcritical regions sufficiently overlap to exceed a critical exposure for the subcritical regions when the beam is scanned at a desired velocity and an average exposure provided by the beam is equal to a desired amount.

16. The apparatus of claim 15, wherein the solidified portion of the solidifiable medium is surrounded by the subcritical region of partially polymerized solidifiable medium.

* * * * *